No. 866,468. PATENTED SEPT. 17, 1907.
J. HOPPER.
FRAME FOR SUPPORTING THE HOODS OF ROAD VEHICLES.
APPLICATION FILED JUNE 22, 1906.

WITNESSES:
G. V. Lymes.
Edward George.

INVENTOR.
John Hopper.
Per Robert E. Phillips.
Attorney.

UNITED STATES PATENT OFFICE.

JOHN HOPPER, OF FULHAM, ENGLAND.

FRAME FOR SUPPORTING THE HOODS OF ROAD-VEHICLES.

No. 866,468.  Specification of Letters Patent.  Patented Sept. 17, 1907.

Application filed June 22, 1906. Serial No. 322,880.

*To all whom it may concern:*

Be it known that I, JOHN HOPPER, a subject of the King of Great Britain and Ireland, residing at 9 Ryecroft street, Fulham, in the county of Middlesex, England, have invented a new and useful Frame for Supporting the Hoods of Road-Vehicles, of which the following is a specification.

This invention relates to hoods for road vehicles, and more particularly to those used on vehicles propelled by mechanical means, and it consists of an improved frame for carrying the cover, the object being to dispense with the usual radial supporting rods which are inconvenient on bodies having side entrances. I attain this object in the manner shown in the accompanying drawing, in which:—

Figure 1:
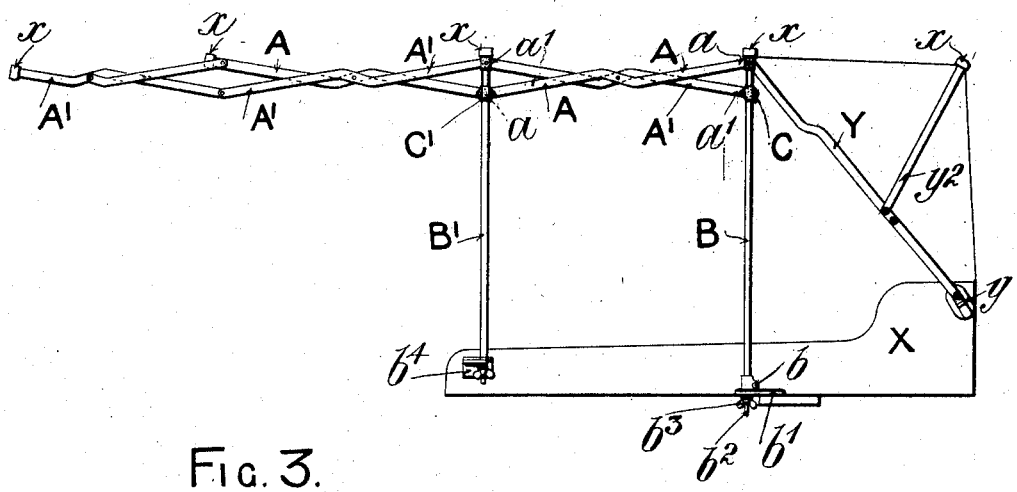
Figure 3:
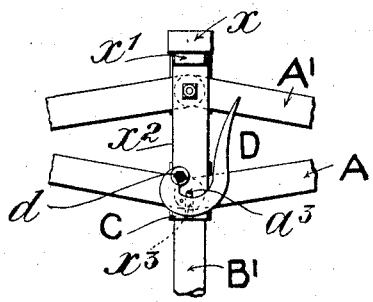
Figure 2:
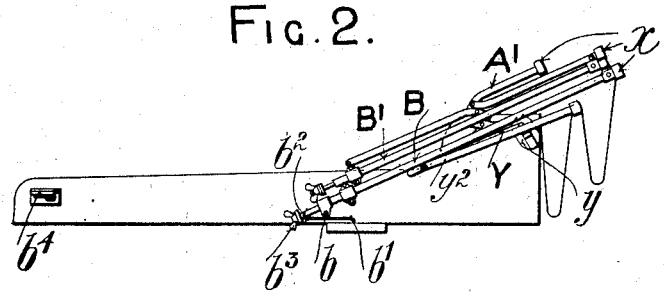

Figure 1 is a part view in side elevation of a hood frame in its extended or spread position, Fig. 2 is a similar view of the frame in its closed position, and Fig. 3 is a detail view on an enlarged scale.

Similar letters refer to similar parts throughout the several views:—

The side members of the frame are made up of a series of pairs of links A, $A^1$, so constructed and arranged as to form and operate as "lazy-tongs". The transverse members $x$ of the frame, which carry the cover and of which there may be any convenient number, are carried by brackets $x^1$ fixed to the upper ends of the links forming said side members.

The ends of the rear pairs of links A, $A^1$ are connected to a pair of supporting members B—one on each side of the body of the vehicle—the end $a$ of the link A being pivoted to the said supporting member and the end $a^1$ of the link $A^1$ being pivoted to a socket C adapted to slide on said member. The other ends of the said links A, $A^1$ are attached to a second supporting member $B^1$ in the reverse manner, *i. e.* the end $a^1$ of the link $A^1$ is pivoted to said member and the end $a$ of the link A is pivoted to the sliding socket $C^1$.

The rear supporting members B are pivoted at $b$ to suitably shaped brackets $b^1$ fixed to the rear part of the body X of the vehicle, the arrangement being such that the said supports can be readily fixed in an upright position when it is desired to spread the hood. A convenient method of effecting this is to form the lower ends $b^2$ as screws to receive nuts $b^3$ which when the said supports are brought into an upright position are screwed up and take a bearing on the undersides of the brackets $b^1$, for which purpose the said brackets are slotted or forked. The continuation of the frame to the back of the body of the vehicle may be of the usual construction comprising collapsible stretchers Y pivoted at one end to the tops of the members B and at the other to brackets $y$ fixed on the body of the vehicle, the said stretchers carrying the spreading struts $y^2$.

The front supporting members $B^1$ are adapted to fit in sockets or brackets $b^4$ fixed to the front seats of the vehicle and to be clamped thereto by any suitable device, such, for instance, as that described for fixing the members B in an upright position. Forward of the second supporting member $B^1$ the side frames may consist of any number of pairs of links A, $A^1$, according to the length of the body the hood is required to cover, the forward end of the frame consisting of single links, as shown.

When the hood is not in use, *i. e.* is not spread the front supporting members $B^1$ lie back against the rear supporting members B which are released at their points or pivot $b$ so that they can fold back, and the "lazy-tong" side members collapse or shut up as shown in Fig. 2. To spread the hood, the rear supporting members B are first fixed in an upright position, the forward members $B^1$ are then moved forward and fixed in their brackets $b^4$, which movement causes the whole length of the "lazy-tong" side members to extend. The side members of the frame are kept extended, either by means of the usual straps connecting the forward end of the frame of the vehicle, or alternatively the sockets $a^1$ may be locked to the supporting members B & $B^1$ in any convenient manner, such, for instance, as the device illustrated by Fig. 3, which consists of a pair of depending plates $x^2$ carried by the brackets $x^1$ and having slots $x^3$ in their lower ends, which, when the "lazy-tong" members are extended, engage pins $a^3$ carried by the sliding brackets C and are kept in engagement therewith by means of cam-shaped levers D pivoted at $d$ to the plates $x^2$, the said levers being so shaped as to draw the two together and retain them in that position.

It will thus be seen that there are no radial, diagonal, or other rods across the sides of the body between the front and back seats so that access to the side entrances of the back part of the body is not impaired.

What I claim as my invention, and desire to secure by Letters Patent, is:—

1. In a hood or canopy frame for road vehicles, the combination of a pair of supports pivoted to brackets on the body of the vehicle behind the entrances to the rear part of the vehicle, of a pair of supports removably fixed to brackets on the body of the vehicle in front of the said entrances, of sockets sliding on said supports, of means for locking said supports in their vertical positions, of two collapsible side members comprising a series of links constructed and arranged to operate on the "lazy-tongs" principle, the rear pairs of links of the said members being connected to the supports in the following manner, that is the rear end of one link of each pair being pivoted to the rear supports and the front ends of said links being pivoted to the sockets sliding on the front supports and the rear end of the other link of each pair being pivoted to the sockets sliding on the rear supports and the front ends of said links being pivoted to the front supports, of transverse members carried by the upper ends of the links forming the side members, and of means for locking the sliding sockets to the supports, as set forth.

2. In a hood or canopy frame for road vehicles, the combination of a pair of supports pivoted to brackets on the body of the vehicle behind the entrances to the rear part of the vehicle, of a pair of supports removably fixed to brackets on the body of the vehicle in front of the said entrances, of sockets sliding on said supports, of means for locking said supports in their vertical positions, of two collapsible side members comprising a series of links constructed and arranged to operate on the "lazy-tongs" principle, the rear pairs of links of the said members being connected to the supports in the following manner, that is the rear end of one link of each pair being pivoted to the rear supports and the front ends of said links being pivoted to the sockets sliding on the front supports and the rear end of the other link of each pair being pivoted to the sockets sliding on the rear supports and the front ends of said links being pivoted to the front supports, of transverse members carried by the upper ends of the links forming the side members, of means for locking the sliding sockets to the supports, of collapsible stretchers pivoted both to the tops of the rear supports and to brackets on the sides of the body of the vehicle, of struts carried by said stretchers, and of a cover or canopy carried and supported by said frame, as set forth.

3. In a hood or canopy frame for road vehicles, the combination of a pair of supports pivoted to brackets on the body of the vehicle behind the entrances to the rear part of the vehicle, of a pair of supports removably fixed to brackets on the body of the vehicle in front of the said entrances, of sockets sliding on said supports, of means for locking said supports in their vertical positions, of two collapsible side members comprising a series of links constructed and arranged to operate on the "lazy-tongs" principle, the rear pairs of links of the said members being connected to the supports in the following manner, that is the rear end of one link of each pair being pivoted to the rear supports and the front ends of said links being pivoted to the sockets sliding on the front supports and the rear end of the other link of each pair being pivoted to the sockets sliding on the rear supports and the front ends of said links being pivoted to the front supports, of transverse members carried by the upper ends of the links forming the side members, of collapsible stretchers pivoted both to the tops of the rear supports and to brackets on the sides of the body of the vehicle, of struts carried by said stretchers, of a cover or canopy carried and supported by said frame, and of locking devices for fixing the sockets to the supports, comprising slotted plates carried by the said supports, pins carried by the said sockets and engaging the slots in the plates, and cam-shaped levers pivoted to the slotted plates and adapted to engage the pins carried by the sockets, as set forth.

JOHN HOPPER.

Witnesses:
ROBERT E. PHILLIPS,
G. V. SYMES.